United States Patent
Butler et al.

(10) Patent No.: US 11,276,023 B1
(45) Date of Patent: Mar. 15, 2022

(54) MACHINE LEARNING OPTIMIZATION FOR FRAUD DETECTION

(71) Applicant: Amazon Technologies, Inc., Seattle, WA (US)

(72) Inventors: Matthew Butler, Seattle, WA (US); Christos Faloutsos, Pittsburg, PA (US); Mina Loghavi, Kirkland, WA (US); Yi Fan, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 182 days.

(21) Appl. No.: 16/563,447

(22) Filed: Sep. 6, 2019

(51) Int. Cl.
G06Q 10/00 (2012.01)
G06Q 10/06 (2012.01)
G06N 20/00 (2019.01)
G06Q 20/40 (2012.01)

(52) U.S. Cl.
CPC ......... *G06Q 10/0635* (2013.01); *G06N 20/00* (2019.01); *G06Q 20/4016* (2013.01)

(58) Field of Classification Search
CPC .. G06Q 10/063; G06Q 10/0635; G06N 20/00; G06N 20/4016
See application file for complete search history.

(56) References Cited

U.S. PATENT DOCUMENTS

| | | | | |
|---|---|---|---|---|
| 2008/0071721 A1* | 3/2008 | Wang | ...................... | G06N 20/00 706/48 |
| 2011/0264612 A1* | 10/2011 | Ryman-Tubb | ..... | G06Q 20/4016 706/12 |
| 2014/0282856 A1* | 9/2014 | Duke | ...................... | H04L 63/20 726/1 |
| 2016/0078367 A1* | 3/2016 | Adjaoute | .............. | G06F 16/215 706/12 |
| 2016/0342903 A1* | 11/2016 | Shumpert | ............. | G06F 11/079 |
| 2019/0340583 A1* | 11/2019 | Dubinsky | ................ | G06N 3/04 |
| 2020/0175314 A1* | 6/2020 | Fang | .................... | G06N 3/0454 |
| 2020/0210808 A1* | 7/2020 | Dong | ..................... | G06N 3/084 |

OTHER PUBLICATIONS

Kim, G., Chae, B. K., & Olson, D. L. (2013). A support vector machine (SVM) approach to imbalanced datasets of customer responses: Comparison with other customer response models. Service Business, 7(1), 167-182. (Year: 2013).*

* cited by examiner

*Primary Examiner* — William S Brockington, III
(74) *Attorney, Agent, or Firm* — K&L Gates LLP

(57) ABSTRACT

Devices and techniques are generally described for fraud detection. A machine learning model is used to determine a first fraud risk score for a first transaction. The machine learning model includes a first set of weights. A first covariance matrix is determined for the machine learning model based at least in part on the first fraud risk score. A second set of weights for the machine learning model is determined. The second set of weights is determined based on the first set of weights and the first covariance matrix. In various examples, the machine learning model with the second set of weights is used to determine a second fraud risk score for a second transaction. A fraud decision surface is determined and the second fraud risk score is compared to the fraud decision surface. Data indicating that the second transaction is fraudulent is sent to a computing device.

21 Claims, 8 Drawing Sheets

MACHINE LEARNING OPTIMIZATION FOR FRAUD DETECTION

BACKGROUND

Online transactional fraud attempts continue to grow year-over-year, putting pressure on retailers to innovate in order to protect customers and revenue. The field of online fraud detection can be categorized as an adversarial environment, where those with intentions to commit fraud are pitted against those endeavoring to prevent and deter such activity. This "arms race," as it is often referred to, involves continuous adaptation, as tactics of the opponents evolve over time.

DETAILED DESCRIPTION

Figure 1:
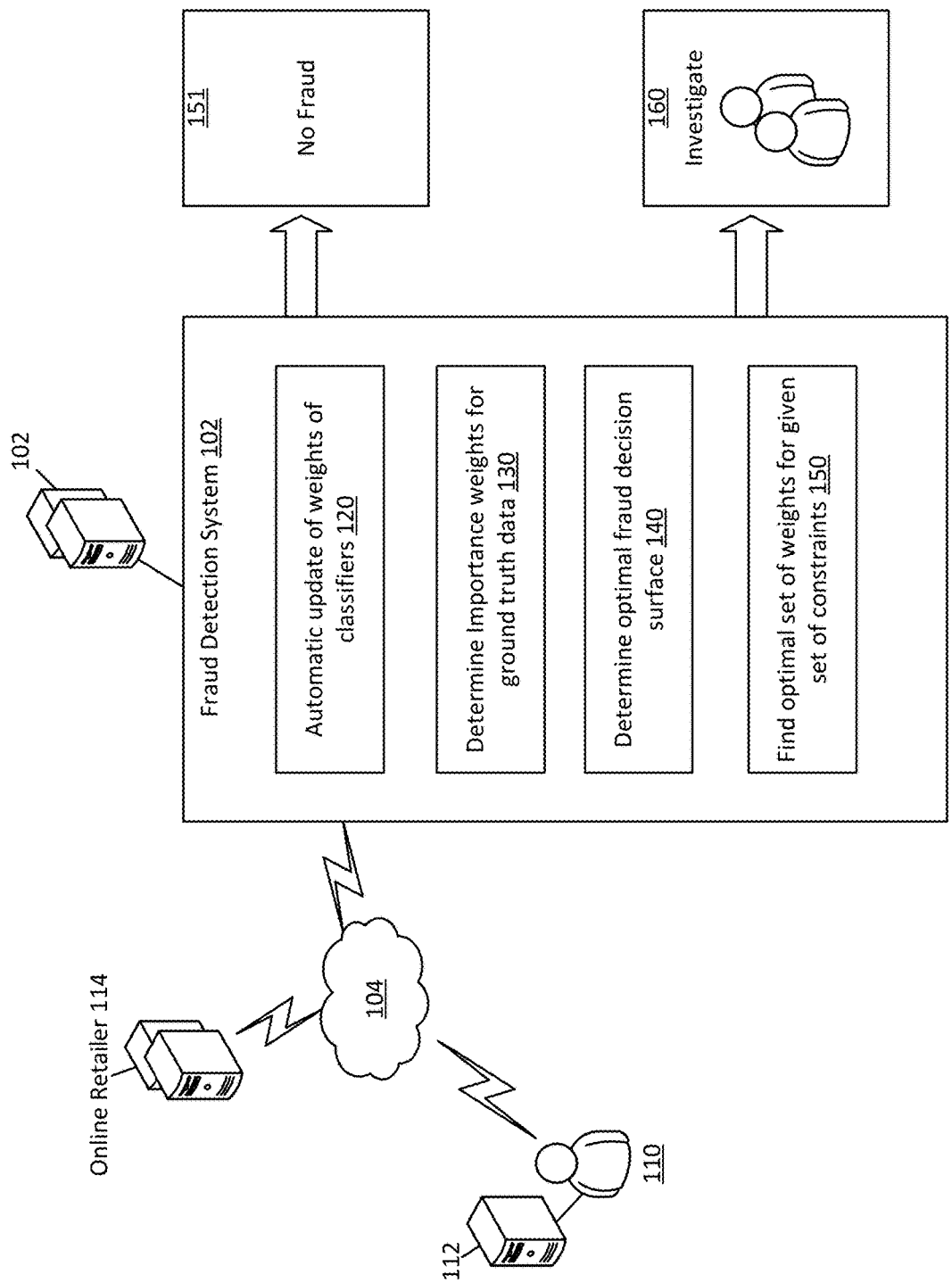
FIG. 1 is a block diagram illustrating example components of a fraud detection system, according to various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Perpetrators of transactional fraud in the online retail space continually attempt to modify their behavior and/or the characteristics of their fraudulent transactions in order to avoid detection by automated fraud filters and/or fraud detection machine learning models used to distinguish between potentially fraudulent transactions and non-fraudulent transactions. As a result, technologies are continuously developed by fraud prevention teams to attempt to detect and prevent fraud in an ever-evolving climate. Accordingly, the actions of perpetrators of fraud (referred to herein as "fraudsters") and fraud prevention teams are adversarial in nature, as a change in fraud detection techniques results in evolving fraudster methodologies, and vice versa.

Machine learning models can be trained to detect fraudulent behavior. However, machine learning models trained using historical data may underperform due to the constantly-changing adversarial environment described above. Various computer-implemented techniques that may be used to predict whether or not a particular transaction is fraudulent are described herein. Additionally, the various fraud prevention techniques described herein can be adapted to the changing behavior of fraudsters and/or to a given set of constraints. Examples of such constraints can include a number of human investigators available during a given time period to investigate fraud and/or a threshold amount of monetary loss due to fraud for a particular time period, etc. In various examples, when a particular transaction is determined by a machine learning model to be potentially-fraudulent, the transaction data is sent to a computing device associated with a fraud investigator, along with details of the transaction, so that the fraud investigator may determine whether or not the transaction is fraudulent or whether the transaction should be allowed to be processed.

In particular, computer-implemented methods are described that automatically update weights of k machine learning models used to predict whether or not a transaction is fraudulent based on new ground truth data. In some embodiments herein, updating the weights (or sets of weights) of machine learning models is referred to as determining updated states of the machine learning models. Additionally, the automatic determination of machine learning model weights may take into account the recentness of ground truth data. Further, computer-implemented methods are described that provide importance weights to ground truth data points that are close to a fraud-decision surface. As described in further detail below, such importance weights may be particular beneficial for updating predictive models in an adversarial environment.

Furthermore, various computer-implemented techniques are described for determining an optimal decision surface for determining whether or not a particular transaction should be allowed or flagged as potentially fraudulent, given the various costs/benefits of such a decision. The fraud-decision surface is optimized based on the profitability of a given transaction as well as based on the cost of using other resources to investigate the transaction. Additionally, various computer-implemented techniques are described for determining a best set of weights (e.g., a Pareto optimal set of weights) of the various machine learning models given a particular set of constraints, in order to enable quick adaptation to changing constraints.

In various examples, a Kalman filter (e.g., the Extended Kalman Filter (EKF)) is used to automatically and incrementally update weights of machine learning classifiers used to predict fraud. Advantageously, use of a Kalman filter in the adversarial fraud prevention context allows for incremental training of machine learning models as new ground truth data becomes available. Incremental and dynamic updates of machine learning models using the Kalman filter provides increased prediction accuracy relative to batch-trained models in the adversarial context. Additionally, use of Kalman filters to train multiple models in an ensemble of classifiers may use Bayesian inference to dynamically update the machine learning models.

Kalman filtering uses a system's dynamic model, known control inputs to that system (e.g., current weights of the model), and multiple sequential measurements (e.g., transactional data over time) to form an estimate of the system's varying quantities (e.g., the weights) that is better than the estimate obtained by using only a single measurement.

Kalman filtering deals effectively with the uncertainty due to noisy data and to some extent also with random external factors. Kalman filtering generates an estimate of the state of the system as an average of the system's predicted state and of the new measurement using a weighted average. The purpose of the weights is that values with better (i.e., smaller) estimated uncertainty are "trusted" more. The weights are calculated from the covariance, a measure of the estimated uncertainty of the prediction of the system's state. The result of the weighted average is a new state estimate that lies between the predicted and measured state, and that exhibits a better estimated uncertainty than either alone. The Kalman filtering process is repeated at every time step, with the new estimate and its covariance informing the prediction used in the following iteration. Accordingly, Kalman filtering is recursive and uses only the last estimate, rather than the entire history, of a system's state to calculate a new state.

The response of the Kalman filter is often referred to as the Kalman gain. The Kalman gain is the relative weight given to the measurements and current state estimate, and can be "tuned" to achieve particular performance. With a high gain, the Kalman filter places more weight on the most recent measurements, and thus follows them more responsively. With a low gain, the Kalman filter follows the model predictions more closely. At the extremes, a high gain close to one will result in a more "jumpy" estimated trajectory, while low gain close to zero will smooth out noise but decrease the responsiveness.

As previously described, the various machine learning models described herein may be automatically updated in a dynamic fashion based on the labeled training data (e.g., labeled ground truth data), as such training data becomes available. Dynamically updating machine learning models in this way is sometimes referred to as "online learning." In the presence of adversarial fraud attacks, online learning becomes more powerful due to its advantages in incorporating emerging data patterns in real time rather than based on historical data.

Additionally, ensemble learning (e.g., the combination of multiple machine learning models into one or more predictive models) is a popular technique used to overcome individual shortcomings of one model or another. Kalman filters have been used for ensemble learning; however, previous applications are typically directed to non-adversarial, stationary environments.

FIG. 1 is a block diagram illustrating example components of a fraud detection system 102, according to various embodiments of the present disclosure. In various examples, an online retail customer 110 may use a computing device 112 to enter into a transaction over network 104 with an online retailer 114 (e.g., through a server of the online retailer). In various examples, network 104 is a wide area network, such as the Internet, while in other embodiments, the network 104 is a local area network (LAN) over which online orders may be placed. In some further embodiments network 104 is a combination of the Internet and a LAN.

In the example, fraud detection system 102 is implemented by computing devices of online retailer 114 and/or is provided as a service by another computing device accessible by online retailer 114 over network 104. Fraud detection system 102 is effective to evaluate a particular transaction and classify the transaction as either potentially fraudulent (action 160) or non-fraudulent (action 151). Transactions determined to be non-fraudulent are passed and fraud detection system 102 sends a signal to online retailer 114 indicating that the transaction may be processed and carried out. Conversely, if a transaction is determined to be potentially fraudulent, the details of the transaction are passed to human investigators for a fraud investigation and/or a signal is sent to online retailer 114 indicating that the transaction is or may be fraudulent and that the transaction should either be terminated or suspended until a determination as to fraud is made.

Fraud detection system 102 includes one or more non-transitory computer-readable memories effective to store instructions that, when executed by at least one processor of fraud detection system 102, are effective to program the at least one processor to perform various actions related to updating, executing, and/or instantiating one or more machine learning models used to detect fraud.

For example, in some embodiments, instructions are effective to program fraud detection system 102 to perform an automatic update of weights of classifier models used to classify fraudulent transactions (action 120). Further, in some embodiments, instructions are effective to program fraud detection system 102 to determine importance weights for ground truth data (action 130) used to train the various machine learning models of fraud detection system 102. Further, in some embodiments, instructions are effective to program fraud detection system 102 to determine an optimal fraud decision surface (action 140) for classifying transactions as either fraudulent or non-fraudulent, in accordance with various aspects of the present disclosure. Further, in some embodiments, instructions are effective to program fraud detection system 102 to find an optimal set of weights for a given set of constraints (action 150) for the various machine learning models of fraud detection system 102.

Figure 2A:
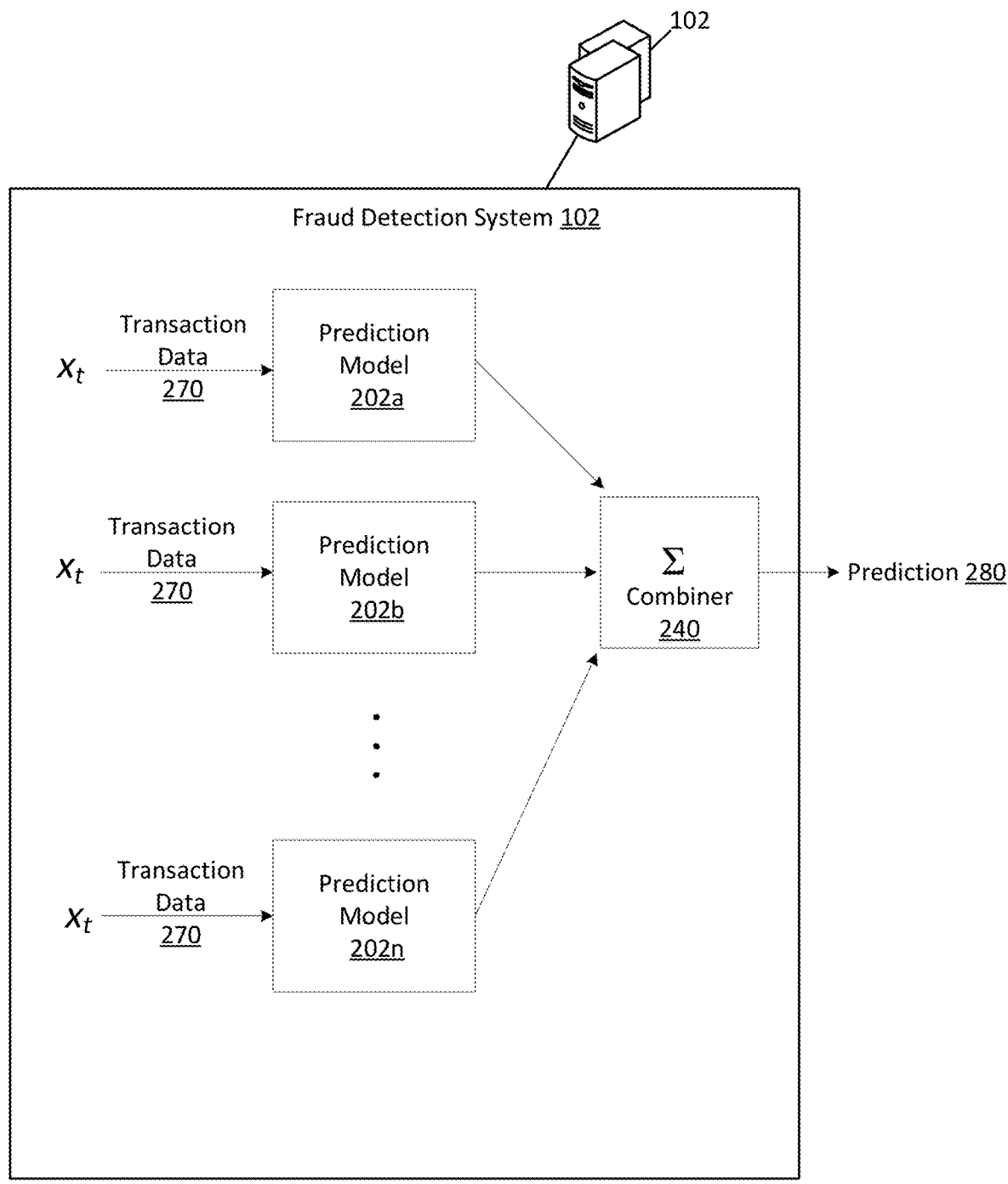
FIG. 2A is a block diagram illustrating prediction models of the fraud detection system, in accordance with various embodiments of the present disclosure.

FIG. 2A is a block diagram illustrating prediction models of the fraud detection system 102, in accordance with various embodiments of the present disclosure. In various embodiments, fraud detection system 102 comprises a plurality of machine learning prediction models $202a \ldots 202n$ used to determine whether or not a transaction is likely to be fraudulent.

In the embodiment depicted in FIG. 2A, prediction models $202a, 202b, \ldots, 202n$ are machine learning models used to generate a prediction as to whether or not a particular transaction is a fraudulent transaction (e.g., machine learning fraud detection models). Each of prediction models $202a, 202b, \ldots, 202n$ may use a different machine learning algorithm (e.g., logistic regression, random forest, a neural network, etc.) in order to use a plurality of different classification methods to generate a prediction as to whether a particular purchase is fraudulent or legitimate. Transaction data 270 (e.g., $x_t$), is a vector describing a particular transaction. In various examples, transaction data 270 may describe a purchase amount, a time at which the transaction occurred, a delivery address, a quantity of the item purchased, etc. In general, any desired features of a transaction may be represented using transaction data 270, according to the particular implementation. Each of prediction models $202a, 202b, \ldots, 202n$ can receive the same transaction data 270 as input and outputs a confidence score indicating a confidence that the transaction data 270 represents (or does not represent, depending on the implementation) fraud. The confidence scores of each of prediction models $202a, 202b, \ldots, 202n$ are sent to a combiner 240 (e.g., a sigmoid function) that may normalize and/or combine the scores to generate a weighted average (prediction 280). The weighted average may represent a consensus of the prediction models $202a, 202b, \ldots, 202n$. Prediction 280 is the combined result from the plurality of prediction models $202a, 202b, \ldots,$ 202n, indicating whether or not the ensemble of models has determined the transaction to be fraudulent.

In various examples, different actions may be taken by fraud detection system depending on whether or not prediction 280 indicates fraud. For example, if prediction 280 indicates fraud, the transaction data 270 can be sent to a fraud investigator (e.g., a human investigator and/or a fraud investigation system) to determine whether or not the transaction is fraudulent and whether or not the transaction should be processed. If prediction 280 indicates that the transaction is not fraudulent, the transaction is allowed to proceed as normal. Labeled ground truth data (e.g., historical transaction data that is labeled as "fraudulent" or "non-fraudulent" and the associated prediction value by fraud detection system 102) may be received at any desired cadence. For example, labeled ground truth data may be received on a daily basis and/or as such data is received (from a credit card company, for example).

Figure 2B:
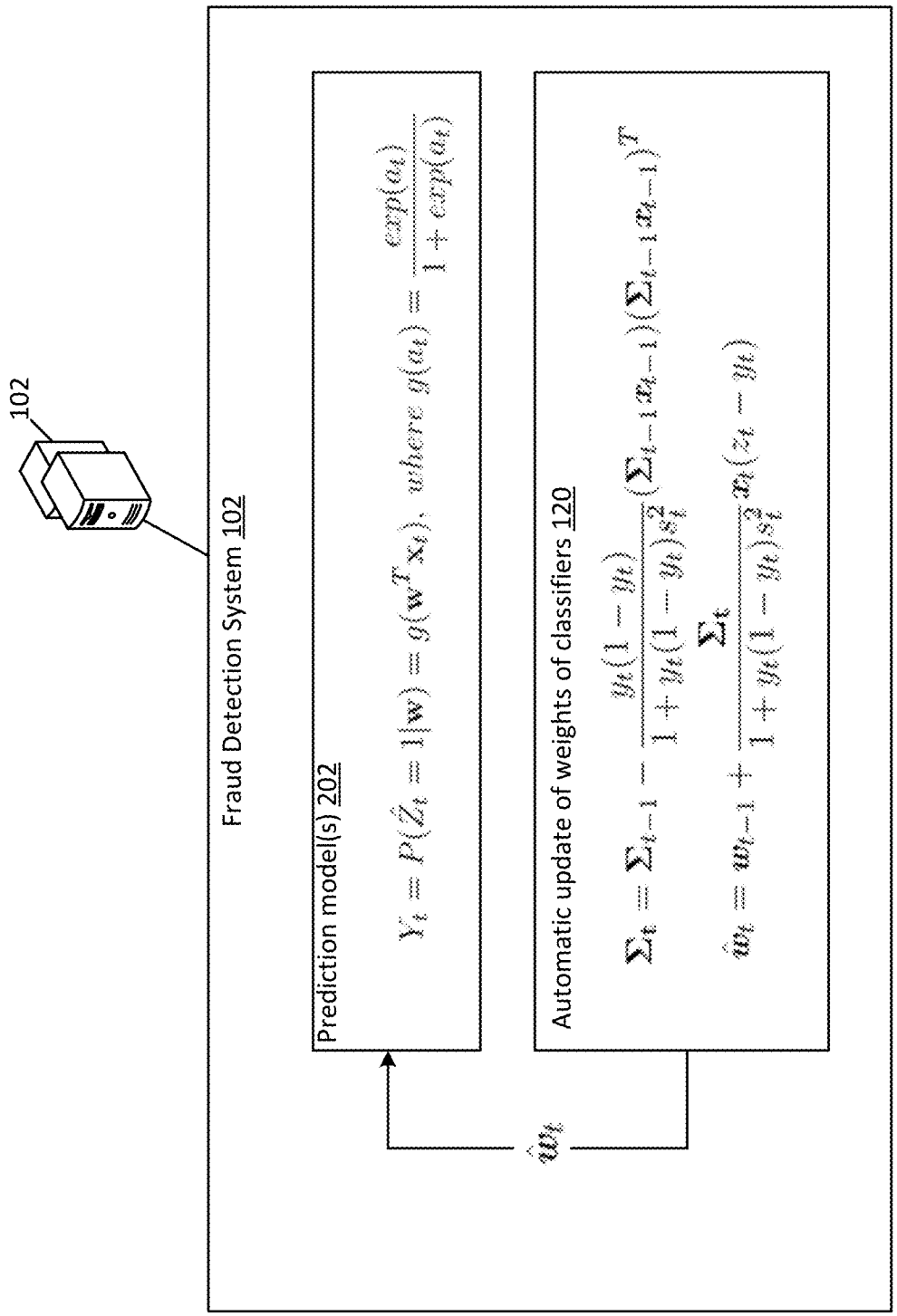
FIG. 2B is a block diagram illustrating update of the weights of prediction models of the fraud detection system, in accordance with various embodiments of the present disclosure.

FIG. 2B is a block diagram illustrating update of the weights of prediction models of the fraud detection system 102, in accordance with various embodiments of the present disclosure.

As described in further detail below, in an example embodiment, the fraud detection system 102 uses new transactional data with classification labels (e.g., new ground truth data labeled as "fraud" or "not fraud") to update the weights ($w_1 \ldots w_k$) of each prediction model(s) 202 to improve classification accuracy. In various examples, one or more of the prediction model(s) 202 are implemented as logistic regression classifiers, although other machine learning classification algorithms may be used in accordance with the desired implementation. In various examples, different machine learning algorithms are used for different instances of the prediction model(s) 202.

In an example embodiment, the approach uses a Bayesian perspective of logistic regression of the form:

$$Y_t = P(\hat{Z}_t = 1|w) = g(w^T x_t), \text{ where } g(a_t) = \frac{\exp(a_t)}{1 + \exp(a_t)} \quad (1)$$

where the predicted class label $Z_t$ is generated using the relationship defined in equation 1 and $g(a_t)$ is the logistic function and at is the activation at time t. The activation is the linear combination of the model inputs (x) and the weights (w) of the model. Given a labeled data set of input-output pairings, the linear regression classification model is fit using maximum-likelihood (MLE). MLE yields the most probable parameter vector and ignores all of the uncertainty in the model, which cannot be considered in future updates or predictions. Accordingly, in order to take into account the uncertainty, in an embodiment, a Bayesian framework is used that considers the evolution of the distribution of the model parameters through time. Simplifying assumptions of a Gaussian form are made for the prior and posterior distributions of the model parameters to achieve closed-form scalable updated equations. Incremental weight updates of the prediction model(s) 202 are achieved using a Kalman filter. In the example depicted in FIG. 2B, an Extended Kalman Filter (EKF) is used. In various examples, the EKF is beneficial for non-linear functions. The Kalman filter updates may be simplified to the following compact form:

$$\sum_t = \sum_{t-1} - \frac{y_t(1-y_t)}{1 + y_t(1-y_t)s_t^2} \left(\sum_{t-1} x_{t-1}\right)\left(\sum_{t-1} x_{t-1}\right)^T \quad (2)$$

$$w_t = w_{t-1} + \frac{\sum_t}{1 + y_t(1-y_t)s_t^2} x_t(z_t - y_t) \quad (3)$$

which given the assumed Gaussian posterior ($p(w_t|Y_t)=N(w_t, \Sigma_t)$), the weights $\mu=w_t$ and covariance matrix $\Sigma_t$ of the models are provided. The covariance matrix $\Sigma_t$ represents the uncertainty in the weight distribution of the model. In the equations herein, x is the model input (e.g., a transactional order with vector $x_t$), z is the binary class label (e.g., ground truth label), y is the predicted model output and w are the weights of classifier(s) (updated weights are determined using the EKF equations 2 and 3, above). $s_t^2$ represents the variance of the activation function (e.g., the sigmoid function).

Accordingly, in some embodiments, the Kalman filter is used to update the weights of the prediction model(s) 202 in a dynamic and automatic manner, increasing classification accuracy. Further, using the techniques described above, the classifiers are incrementally updated (as opposed to batch updated) and thus may be more agile in the non-stationary and adversarial fraud-detection context.

In various examples, the weight updates described above are further adapted to a non-stationary environment. In a non-stationary environment it may be advantageous to gradually forget previously learned patterns. With online learning, this may be achieved with a forgetting function that diminishes model parameters overtime. With respect to fraud detection system 102, forgetting can be implemented using an increase in the covariance matrix $\Sigma$, as a larger covariance entails more uncertainty in the model, and thus less reliance on past observations. When there is more uncertainty in the prior, the model updates place more weight on the latest observations. In some embodiments, an EKF model is extended to non-stationary environments by including a term $q_t$ in the update equations, where $q_t I$ is an isotropic covariance matrix describing the impact of the state noise on the current estimate of variance in the priors. However, it may be difficult to accurately estimate the state-noise and represent the state-noise in $q_t$.

Rather than estimating the state noise, a different approach includes estimation of a weight (e.g., a function of time since an order was placed) to be applied to the current observation and thus the Kalman filter gain update. For example, in some embodiments, a decay coefficient a is be applied to the current Kalman Gain for purposes of update of weights w of prediction model(s) 202.

Adding a decay coefficient a to the Kalman gain creates the following new update equations, for w and $\Sigma$, as:

$$w_t^* = w_{t-1} + aK_t(z_t - y_t) \quad (4)$$

$$\sum_t = \sum_{t-1} + a(a-2)K_t H_t \sum_{t-1} \quad (5)$$

where a is a scalar >1 and K is the Kalman filter gain:

$$K_t = \sum_{t-1}^{*} H_t \left( H_t \sum_{t-1}^{*} H_t^T + R_t \right)^{-1}$$

$H_t$ is the partial derivative of the logit function $h(w_t, x_t)$ with respect to $w_t$, a is a scalar >1, and other quantities are as previously defined. In some embodiments, the value of a is selected dynamically. In various examples, when a is selected as >2, the covariance matrix increases in value with the update and thus "forgets" previous observations and relies more heavily on the current data point. Accordingly, a is used to implement a linear and/or exponential decay in order to emphasize more recent labeled training data (e.g., more recent transactions) over older labeled training data (e.g., older transactions) in updating the weights w of prediction model(s) 202. As such, transactional data points for recent purchases may affect a greater change in weights of the prediction models 202a, . . . , 202n relative to data points that are later in time.

Figure 3:
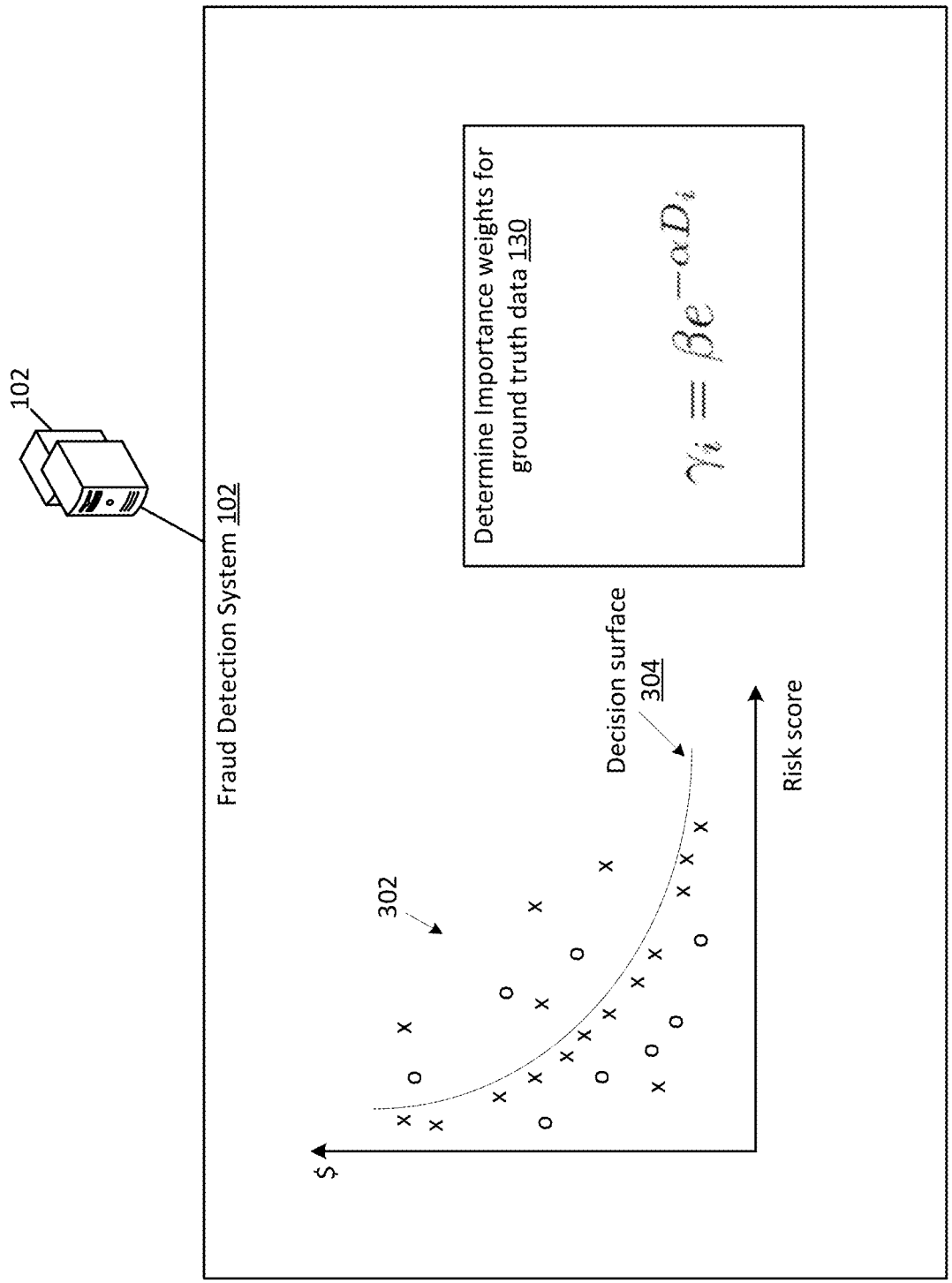
FIG. 3 is a block diagram illustrating determination of importance weights for ground truth data according to the proximity of data to a decision surface, in accordance with various aspects of the present disclosure.

FIG. 3 is a block diagram illustrating determination of importance weights for ground truth data according to the proximity of data to a decision surface, in accordance with various aspects of the present disclosure.

In adversarial domains, it has been observed that those looking to commit fraud will experiment with fraud prevention systems in order to evade the systems. In doing so, a typical fraud pattern can emerge that exists close to a decision surface of the fraud prevention system. Plot 302 illustrates an example pattern of fraudulent behavior. Each "x" in plot 302 represents an order that has been determined to be fraudulent (e.g., by a human investigator). Each "o" in plot 302 represents an order that has been determined to be non-fraudulent (e.g., by a human investigator). Decision surface 304 represents a surface used to classify data points as either non-fraudulent or potentially fraudulent. For example, data points above decision surface 304 may be determined to be potentially fraudulent (and thus may be sent to an investigator) and data points below decision surface 304 may be determined to be non-fraudulent, and thus may be allowed. Accordingly, each "x" below decision surface 304 is problematic, as the system has predicted such transactions to be non-fraudulent although such transactions have subsequently been determined to be fraudulent (e.g., ground truth data determined by a human investigator). Accordingly, as described below, transactional data points that are closer to decision surface 304 are more highly valued when updating the weights of prediction models 202a, . . . , 202n. As such, transactional data points that are closer to decision surface 304 may affect a greater change in weights of the prediction models 202a, . . . , 202n relative to data points that are further away from decision surface 304. In various examples, the data points evaluated in plot 302 may represent a consensus risk score of the prediction models 202a, . . . , 202n for a particular transaction. Additionally, the ground truth label "x" or "o" may represent ground truth data determined by a human investigator.

Plot 302 is a plot of dollar amount of orders vs. the risk score for those orders, the risk score (e.g., $y_t$) indicating the risk of fraud associated with the characteristics of the order. In an adversarial domain, orders of skilled fraudsters (e.g., those that experiment with and attempt to evade fraud detection systems) tend to congregate, over time, close to the decision surface 304 (as shown in FIG. 3). By staying as close to the decision surface as possible, the yield of the fraudulent activity is maximized. At action 130, importance weights are determined for ground truth data by fraud detection system 102. Importance weights provide more weight to those data points (e.g., the order data labeled with ground truth data) that are closer to the decision surface 304. The weight-to-distance (e.g., distance from the decision surface 304) relationship is modeled based on an exponential distribution. The importance weight ($\gamma$) of observation i is given as:

$$\gamma_i = \beta e^{-\alpha D_i} \quad (6)$$

where $\alpha$ and $\beta$ act as hyperparameters of the model and $D_i$ represents a distance between a point i and the decision surface (e.g., a Euclidean distance). A very practical aspect of the EKF is that it is parameter-less. However, this can lead to a lack of flexibility and so the weighting policy provides some opportunities to adapt the model. The generation of decision surfaces, such as decision surface 304, is described below in reference to FIG. 4.

The values of ($\alpha$ & $\beta$) are be selected as hyperparameters. For example, a grid search may be used to generate a set of possible updates to $\alpha$ & $\beta$. The importance weight $\gamma$ of each data point i is used to apply equations (2) and (3) $\gamma$ number of times in order to determine the covariance matrix $\Sigma_t$ and the model weights $w_t$ as weighted by importance weight $\gamma$.

Figure 4:
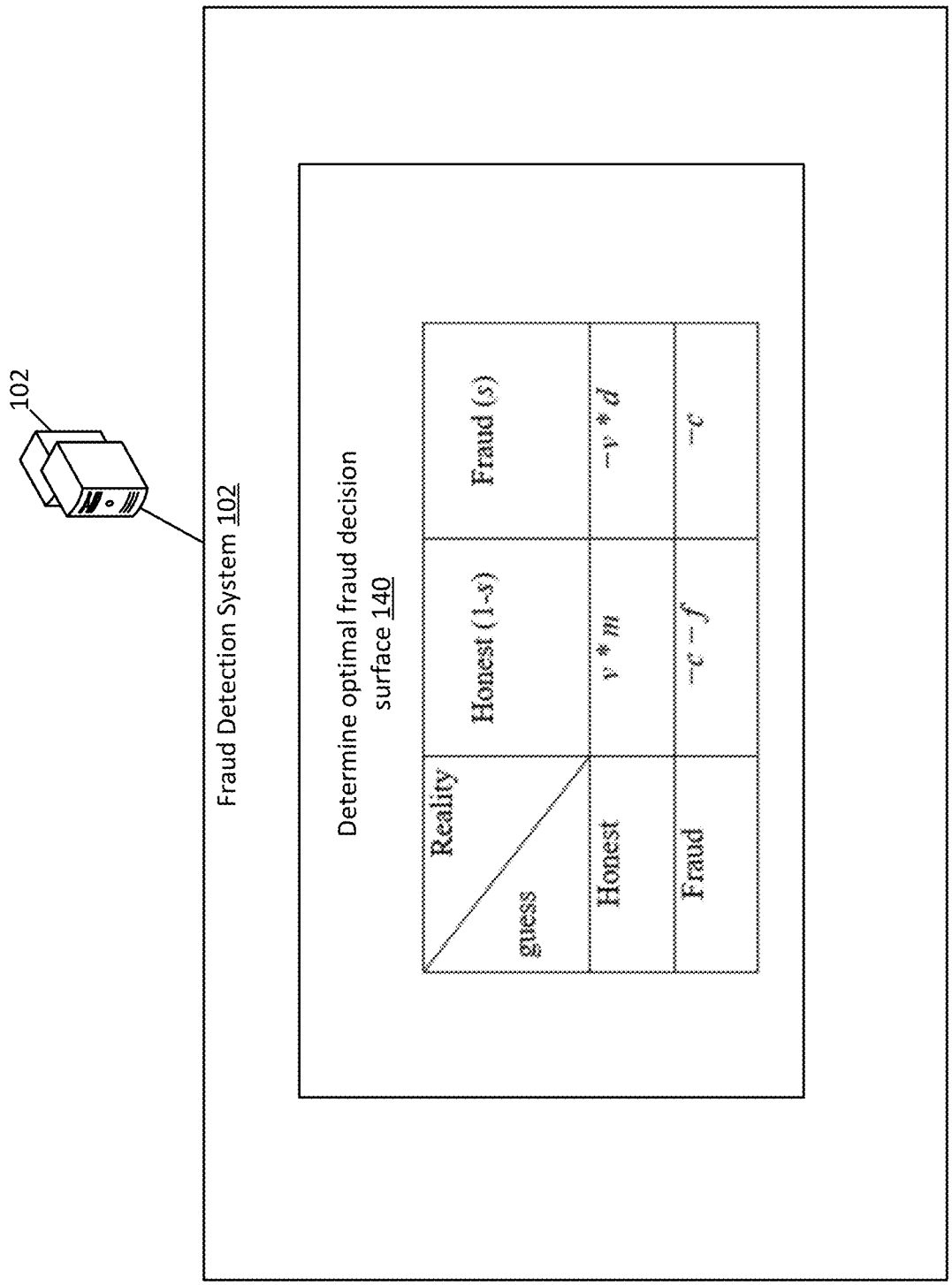
FIG. 4 is a block diagram illustrating determination of a fraud decision surface, in accordance with various aspects of the present disclosure.

FIG. 4 is a block diagram illustrating determination of a fraud decision surface, in accordance with various aspects of the present disclosure. In various examples, the optimal decision surface for investigating orders is derived based on various constraints. The decision surface (e.g., decision surface 304 of FIG. 3) provides a decision boundary delineating between transactional orders that should be classified as potentially fraudulent and transactional orders that should be classified as non-fraudulent. For example, given several transactional orders, where each order is associated with a transaction price (e.g., a dollar amount) and a transaction fraud risk score (e.g., $y_t$), a decision is made which transactional orders should be processed vs. which transactional orders should be investigated for potential fraud.

The optimization problem may be stated as follows: given the cost (e.g., in dollars) of a false alarm (e.g., indicating that a non-fraudulent order is fraudulent), a false dismissal (e.g., indicating that a fraudulent order is fraudulent), and investigation cost (e.g., the cost of investigating an order using a human investigator), and a specific order with risk score s and value (e.g., selling price) v, find the best decision (fraudulent vs. non-fraudulent) and the expected value of the order for the best decision. In effect, for a given order, the price v and the score s (e.g., the probability of being fraudulent, $y_t$) should be combined, to make a decision regarding fraud for the order.

One solution is to estimate the expected value: F( )=v*s. In this scenario, if the price v is low, and the probability of fraud s is also low, then the order will be passed (e.g., the order will be determined to be non-fraudulent). However, this may not be an optimal solution, as an expensive item will almost always be determined as potentially fraudulent, thereby sidelining the order for investigation. Such a result may delay and possibly annoy a non-fraudulent customer.

Instead, a cost-benefit analysis may be used, taking into account the cost of a human investigator c (or the cost of an investigation), the profit margin m, a quantitative estimate of customer friction f (e.g., the cost of a coupon that may be given to a falsely-sidelined customer to compensate them for inconvenience caused by an order being investigated as potentially fraudulent), and the loss from a false dismissal of a transaction d (e.g., often 1–m, but other external events may affect this value (e.g., a credit card declined by a bank)).

For example, the cost of the human investigator c may be $100, the profit margin m may be 0.1 (e.g., a 10% profit margin), the cost of friction f may be $50 (e.g., due to provision of a $50 discount coupon), the ratio d may be 50%. $s_{H,max}$ may be the maximum fraud-score s that is allowed to "pass" the order (e.g., declare the order as non-fraudulent).

With the parameters as described above, the order (v, s) is passed if $s<s_{H,max}$, in the coordinate space of $s_{H,max}$, where:

$$s_{H,max} = 1 - \frac{v*d-c}{v(m+d)+f} \quad (8)$$

Conversely, if $s>s_{H,max}$, the transaction is determined to be potentially fraudulent. In an example embodiment, data indicating the decision as to whether the transaction is fraudulent or not is sent to another computing device (e.g., an investigator computing device) associated with processing the transaction for consideration. The goal in the calculation is to find the expected profit for each decision, and pick the highest expected profit. For example, the expected profit of an ordered deemed to be honest $p_h$ (e.g., where the order is passed as non-fraudulent) is:

$$p_h = v*m*(1-s)+s*(-v)*d$$

That is, with probability s, a fraudulent order is allowed and value of the order is lost (−v); and with probability (1−s) the order is correctly allowed, for a profit of vm. Similarly, the expected profit of an order deemed as fraudulent $p_f$ is:

$$p_f = (-c-f)*(1-s)+s*(-c)$$

An order is therefore passed (e.g., deemed as non-fraudulent) if:

$$p_h > p_f$$

In an example embodiment, the above inequality is solved for s to determine the decision surface (e.g., decision surface 304). The resulting decision surface curve is a hyperbola in the (s, v) plane. This hyperbola may be approximated as a piece-wise linear function to simplify the implementation, if desired. Various methods may be used to fit the curve (e.g., a multi-objective meta-heuristic algorithm). Using the cost-benefit analysis described above to determine a decision surface for fraud detection is advantageous in that the fraud decision surface 304 takes into account the cost of investigation of orders and the profitability/loss associated with an order when determining whether or not a particular transaction is fraudulent.

At action 150 of FIG. 1, various sets of weights are precomputed for the prediction model(s) 202 using the various techniques described herein. In some examples, an optimal set of weights for the machine learning models (e.g., prediction model(s) 202) is determined for a given set of constraints. For example, a constraint may be the number of human investigators during a given time period. In another example, a constraint may be a threshold amount of bad debt (e.g., a maximum dollar amount that should be lost due to fraud during a given time period). Such constraints may be described as business metrics (BM).

Accordingly, a solution is described to find the best set of weights of the prediction model(s) 202 given the current BMs. Accordingly, a Pareto optimal set of solutions in the applicable BM space is determined. A solution on the Pareto frontier stipulates that one metric cannot be improved without the deterioration of another. Formally, the Pareto set of solutions, P(Y), and a function, $f$ that maps a candidate prediction model 202 into BM space $f: \mathbb{R}^n \rightarrow \mathbb{R}^m$ where X is a set of n dimensional weight vectors found with the prediction model 202 represented in the space $\mathbb{R}^n$, and Y is the set of vectors in $\mathbb{R}^m$ (them dimensional BM space) such that: $Y=\{y \in \mathbb{R}^m: y=f(x), x \in X\}$. A point y* in $\mathbb{R}^m$ strictly dominates y', represented as $y^* \prec y'$, when y* outperforms y' in all m dimensions. Thus, the Pareto set is represented as:

$$P(Y)=\{y^* \in Y: \{y' \in Y: y^* \prec y', y^* \neq y'\}=\emptyset\}. \quad (9)$$

Figure 5:
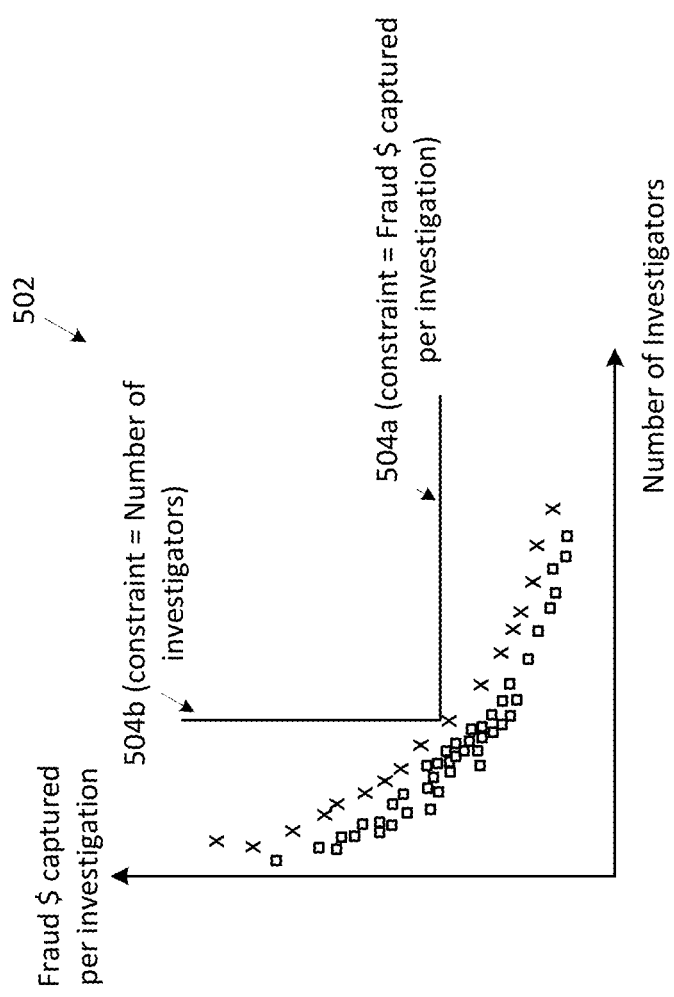
FIG. 5 depicts a Pareto set of optimal weight values for a given set of business metrics, in accordance with various aspects of the present disclosure.

In an example implementation, the BM space is represented as: (1) fraud dollars captured per investigation and (2) count of investigations performed. In an example embodiment, the set of solutions is generated using a grid search of the hyperparameters (α and β) from equation 6, along with a varying ratio of positive-to-negative examples. In FIG. 5 model performance results are depicted after updating using the grid search represented in BM space. The models (e.g., the multi-dimensional set of model weights) on the Pareto front in plot 502 of FIG. 5 are represented by Xs while the squares represent dominated solutions. Accordingly, as shown in FIG. 5, for a particular set of business metrics (e.g., a particular number of investigators and a particular dollar amount of fraud captured per investigation) a particular set of model weights is selected from the Pareto front (according to lines 504a, 504b, representing the business metrics). In other words, the X closest to the intersection of lines 504a, 504b represents the optimal set of model weights (e.g., weights of prediction model(s) 202-determined using Kalman filtering as previously described) for the particular business metrics indicated by lines 504a, 504b.

Figure 6:
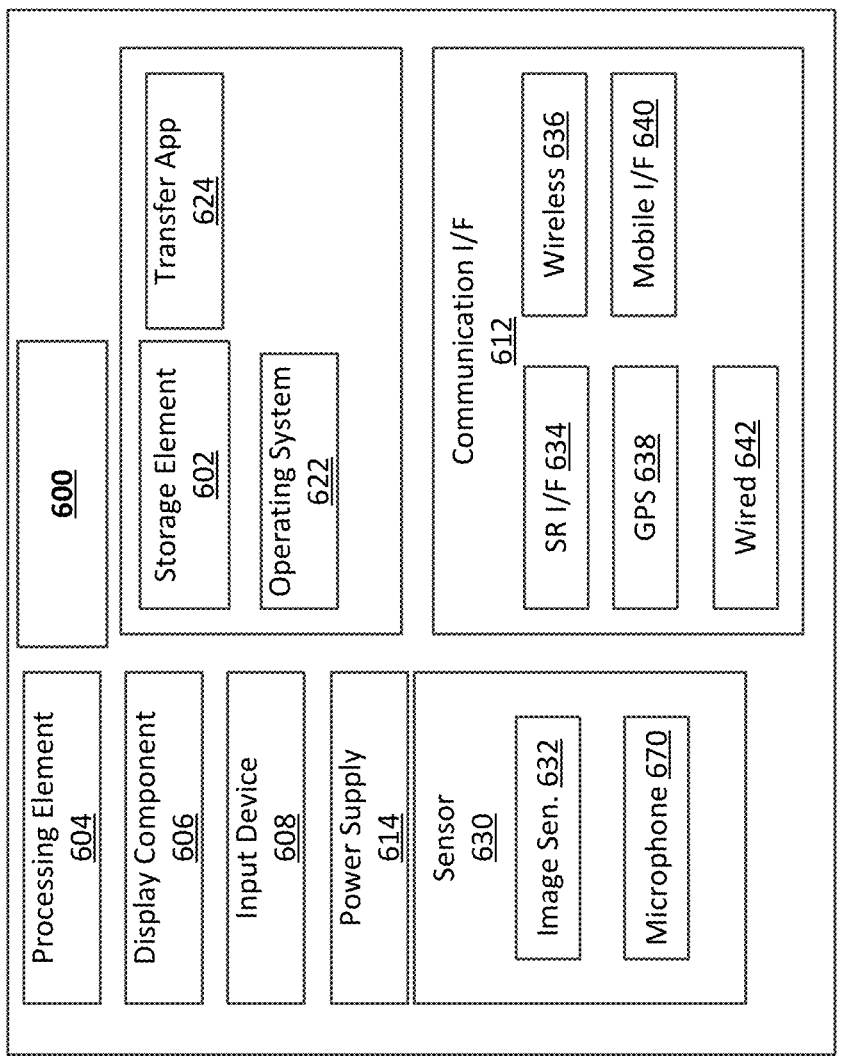
FIG. 6 is a block diagrams showing an example architecture of a computing device that may be used in accordance with various embodiments described herein.

FIG. 6 is a block diagram showing an example architecture 600 of a computing device used to implement fraud detection system 102, in accordance with various aspects of the present disclosure. It will be appreciated that not all devices will include all of the components of the architecture 600 and some user devices may include additional components not shown in the architecture 600. In an example embodiment, the architecture 600 includes one or more processing elements 604 for executing instructions and retrieving data stored in a storage element 602. The processing element 604 comprises at least one processor. Any suitable processor or processors may be used. For example, the processing element 604 may comprise one or more digital signal processors (DSPs). The storage element 602 can include one or more different types of memory, data storage, or computer-readable storage media devoted to different purposes within the architecture 600. In an example embodiment, the storage element 602 comprises flash memory, random-access memory, disk-based storage, etc. Different portions of the storage element 602, for example, are used for program instructions for execution by the processing element 604, storage of images or other digital works, and/or a removable storage for transferring data to other devices, etc. Additionally, storage element 602 may store various weight sets and/or machine learning models of the fraud detection system 102.

The storage element 602 may also store software for execution by the processing element 604. An operating system 622 may provide the user with an interface for operating the computing device and may facilitate communications and commands between applications executing on the architecture 600 and various hardware thereof. In an example embodiment, a transfer application 624 is configured to receive images, audio, and/or video from another device (e.g., a mobile device, image capture device, and/or display device) or from an image sensor 632 and/or microphone 670 included in the architecture 600.

When implemented in some user devices, the architecture 600 comprises a display component 606. The display component 606 can comprise one or more light-emitting diodes (LEDs) or other suitable display lamps. Also, in some examples, the display component 606 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 606 may be effective to display input images and/or segmentation masks generated in accordance with the various techniques described herein.

The architecture 600 may also include one or more input devices 608 operable to receive inputs from a user. Example input devices 608 include a push button, touch pad, touch screen, wheel, joystick, keyboard, mouse, trackball, keypad, light gun, game controller, or any other such device or element whereby a user can provide inputs to the architecture 600. These input devices 608 may be incorporated into the architecture 600 or operably coupled to the architecture 600 via wired or wireless interface. In some examples, architecture 600 may include a microphone 670 or an array of microphones for capturing sounds, such as voice requests. In various examples, audio captured by microphone 670 may be streamed to external computing devices via communication interface 612.

When the display component 606 includes a touch-sensitive display, the input devices 608 can include a touch sensor that operates in conjunction with the display component 606 to permit users to interact with the image displayed by the display component 606 using touch inputs (e.g., with a finger or stylus). The architecture 600 may also include a power supply 614, such as a wired alternating current (AC) converter, a rechargeable battery operable to be recharged through conventional plug-in approaches, or through other approaches such as capacitive or inductive charging.

In an embodiment, the communication interface 612 comprises one or more wired or wireless components operable to communicate with one or more other computing devices. For example, the communication interface 612 may comprise a wireless communication module 636 configured to communicate on a network, such as the network 104, according to any suitable wireless protocol, such as IEEE 802.11 or another suitable wireless local area network (WLAN) protocol. In an embodiment, a short range interface 634 is configured to communicate using one or more short range wireless protocols such as, for example, near field communications (NFC), Bluetooth®, Bluetooth LE, etc. In an embodiment, a mobile interface 640 is configured to communicate utilizing a cellular or other mobile protocol. A Global Positioning System (GPS) interface 638 may be in communication with one or more earth-orbiting satellites or other suitable position-determining systems to identify a position of the architecture 600. In an embodiment, a wired communication module 642 is configured to communicate according to the USB protocol or any other suitable protocol.

The architecture 600 may also include one or more sensors 630 such as, for example, one or more position sensors, image sensors, and/or motion sensors. An image sensor 632 is shown in FIG. 6. Some examples of the architecture 600 may include multiple image sensors 632. For example, a panoramic camera system may comprise multiple image sensors 632 resulting in multiple images and/or video frames that may be stitched and may be blended to form a seamless panoramic output. An example of an image sensor 632 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the fraud detection system 102, as described herein, are exemplary, and may be located as a stand-alone device or may be included, in whole or in part, as a component of a larger device or system.

Figure 7:
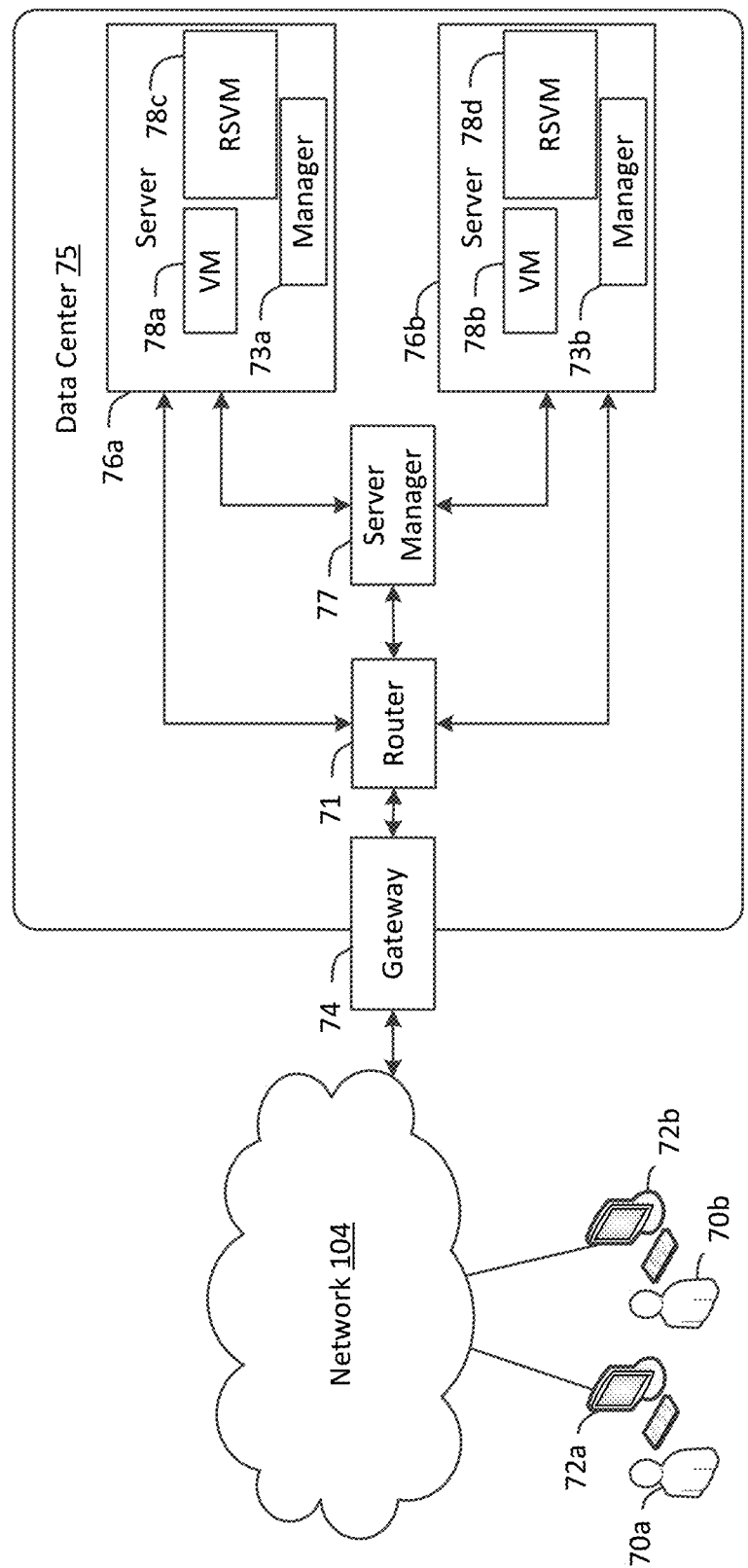
FIG. 7 is a diagram illustrating an example system for sending and providing data that may be used in accordance with the present disclosure.

An example system for sending and providing data and performing various computer processing techniques will now be described in detail. In particular, FIG. 7 illustrates an example computing environment in which the embodiments described herein may be implemented. For example, the computing environment of FIG. 7 may be used to provide fraud detection as a service over a network wherein one or more of the techniques described herein may be requested by a first computing device and may be performed by a different computing device configured in communication with the first computing device over a network. FIG. 7 is a diagram schematically illustrating an example of a data center 75 that can provide computing resources to users 70a and 70b (which may be referred herein singularly as user 70 or in the plural as users 70) via user computers 72a and 72b (which may be referred herein singularly as user computer 72 or in the plural as user computers 72) via network 104. Data center 75 may be configured to provide computing resources for executing applications on a permanent or an as-needed basis. The computing resources provided by data center 75 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more techniques of the fraud detection system 102, as described herein.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 75 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). In at least some examples, server manager 77 may control operation of and/or maintain servers 76. Virtual machine instances 78c and 78d are rendition switching virtual machine ("RSVM") instances. The RSVM virtual machine instances 78c and 78d may be configured to perform all, or any portion, of the techniques for improved rendition switching and/or any other of the disclosed techniques in accordance with the present disclosure and described in detail above. As should be appreciated, while the particular example illustrated in FIG. 7 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and enabling computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 72. User computers 72 may be computers utilized by users 70 or other customers of data center 75. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 75. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 75. In this regard, data center 75 might provide a gateway or web interface through which aspects of its operation may be configured through the use of a web browser application program executing on user computer 72. Alternately, a stand-alone application program executing on user computer 72 might access an application programming interface (API) exposed by data center 75 for performing the configuration operations. Other mechanisms for configuring the operation of various web services available at data center 75 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 73a or 73b (which may be referred herein singularly as instance manager 73 or in the plural as instance managers 73) capable of executing the virtual machine instances 78. The instance managers 73 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 75 shown in FIG. 7, a router 71 may be utilized to interconnect the servers 76a and 76b. Router 71 may also be connected to gateway 74, which is connected to network 104. Router 71 may be connected to one or more load balancers, and alone or in combination may manage communications within networks in data center 75, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 75 shown in FIG. 7, a data center 75 is also employed to at least in part direct various communications to, from and/or between servers 76a and 76b. While FIG. 7 depicts router 71 positioned between gateway 74 and data center 75, this is merely an exemplary configuration. In some cases, for example, data center 75 may be positioned between gateway 74 and router 71. Data center 75 may, in some cases, examine portions of incoming communications from user computers 72 to determine one or more appropriate servers 76 to receive and/or process the incoming communications. Data center 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Data center 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 75 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
determining, by an ensemble of machine learning models, each machine learning model of the ensemble having a respective first state, respective first prediction scores for first input data, the first input data comprising at least one of a first value representing a first feature of the first input data, a time associated with the first input data, and a second value representing a second feature of the first input data;
determining a decision surface with dimensions of the first feature and a prediction score of the ensemble of machine learning models;
combining the respective first prediction scores into a combined prediction score using a combiner function;
comparing the combined prediction score to the decision surface at the first value associated with the first feature of the first input data;
determining a respective second state for each machine learning model of the ensemble, the respective second state determined based at least in part on the respective first state and the decision surface, wherein the respective second state represents an incremental update of the ensemble of machine learning models that is determined by applying an extended Kalman filter between a previous time step and a current time step; and
using the ensemble of machine learning models, each machine learning model having the respective second state, to evaluate fraud risk scores for subsequent input data.

2. The method of claim 1, further comprising:
determining, using the ensemble of machine learning models, each machine learning model having the respective first state, the respective first prediction scores for the first input data, wherein each respective first state comprises a respective first set of weights; and
wherein the respective second state for each of the ensemble of machine learning models comprises a respective second set of weights, wherein the respective second state is determined further based at least in part on the respective first set of weights.

3. The method of claim 1, further comprising:
determining a respective difference score between the respective first prediction scores and a ground truth score associated with the first input data; and
determining an updated state for each machine learning model of the ensemble of machine learning models further based at least in part on each respective difference score.

4. The method of claim 1, further comprising:
selecting a decay coefficient; and
adjusting a value of a weight of a first machine learning model of the ensemble of machine learning models using the decay coefficient, wherein the decay coefficient is effective to emphasize the first input data over other input data received prior in time to the first input data.

5. The method of claim 1, further comprising:
determining an importance weight based at least in part on a distance between second input data and the decision surface; and
determining an updated state for a first machine learning model of the ensemble of machine learning models, the updated state comprising a set of weights of the first machine learning model, wherein the updated state is determined based at least in part on the importance weight.

6. The method of claim 1, further comprising determining the decision surface based at least in part on a first expected profit of second input data determined by the ensemble of machine learning models to be non-fraudulent, and a second expected profit of the second input data determined by the ensemble of machine learning models to be fraudulent.

7. The method of claim 6, further comprising:
determining that a second prediction score of the second input data is greater than the decision surface in a coordinate space of the decision surface; and
sending second data representing the second input data to an investigator computing device for investigation.

8. The method of claim 1, further comprising:
determining a Pareto set of solutions for a first machine learning model of the ensemble of machine learning models for a first set of constraints, the first set of constraints comprising a first metric and a second metric, wherein the Pareto set of solutions comprises a plurality of sets of weights for the first machine learning model;
determining a first value of the first metric and a second value of the second metric; and
determining an updated set of weights from the plurality of sets of weights for the first machine learning model, wherein the updated set of weights corresponds to the first value of the first metric and the second value of the second metric.

9. The method of claim 1, further comprising:
generating, by the ensemble of machine learning models, respective first predictions for second input data;
determining a covariance for the respective first predictions; and
determining an updated set of weights for each machine learning model of the ensemble of machine learning models using the extended Kalman filter based at least in part on the respective first predictions and the covariance.

10. A computing device, comprising:
at least one processor; and
a non-transitory computer-readable memory storing instructions that, when executed by the at least one processor, are effective to program the at least one processor to:
determine, by an ensemble of machine learning models, each machine learning model of the ensemble having a respective first state, respective first prediction scores for first input data, the first input data comprising at least one of a first value representing a first feature of the first input data, a time associated with the first input data, and a second value representing a second feature of the first input data;
determine a decision surface with dimensions of the first feature and a prediction score of the ensemble of machine learning models;
combine the respective first prediction scores into a combined prediction score using a combiner function;
compare the combined prediction score to the decision surface at the first value associated with the first feature of the first input data;
determine a respective second state for each machine learning model of the ensemble, the respective second state determined based at least in part on the respective first state and the decision surface, wherein the respective second state represents an incremental update of the ensemble of machine learning models that is determined by applying an extended Kalman filter between a previous time step and a current time step; and
use the ensemble of machine learning models, each machine learning model having the respective second state, to evaluate fraud risk scores for subsequent input data.

11. The computing device of claim 10, storing further instructions that, when executed by the at least one processor, are further effective to program the at least one processor to:
determine a respective difference score between the respective first prediction scores and a ground truth score associated with the first input data; and
determine an updated state for each machine learning model of the ensemble of machine learning models further based at least in part on each respective difference score.

12. The computing device of claim 10, storing further instructions that, when executed by the at least one processor, are further effective to program the at least one processor to:
select a decay coefficient; and
adjust a value of a weight of a first machine learning model of the ensemble of machine learning models using the decay coefficient, wherein the decay coefficient is effective to emphasize the first input data over other input data received prior in time to the first input data.

13. The computing device of claim 10, storing further instructions that, when executed by the at least one processor, are further effective to program the at least one processor to:
determine an importance weight based at least in part on a distance between second input data and the decision surface; and
determine an updated state for a first machine learning model of the ensemble of machine learning models, the updated state comprising a set of weights of the first machine learning model, wherein the updated state is determined based at least in part on the importance weight.

14. The computing device of claim 10, storing further instructions that, when executed by the at least one processor, are further effective to program the at least one processor to:
determine the decision surface based at least in part on a first expected profit of second input data determined by the ensemble of machine learning models to be non-fraudulent, and a second expected profit of the second input data determined by the ensemble of machine learning models to be fraudulent.

15. The computing device of claim 14, storing further instructions that, when executed by the at least one processor, are further effective to program the at least one processor to:
determine that a second prediction score of the second input data is greater than the decision surface in a coordinate space of the decision surface; and send second data representing the second input data to an investigator computing device for investigation.

16. The computing device of claim 10, storing further instructions that, when executed by the at least one processor, are further effective to program the at least one processor to:
determine a Pareto set of solutions for a first machine learning model of the ensemble of machine learning models for a first set of constraints, the first set of constraints comprising a first metric and a second metric, wherein the Pareto set of solutions comprises a plurality of sets of weights for the first machine learning model;
determine a first value of the first metric and a second value of the second metric; and
determine an updated set of weights from the plurality of sets of weights for the first machine learning model, wherein the updated set of weights corresponds to the first value of the first metric and the second value of the second metric.

17. A method comprising:
determining, using a machine learning model having a first state, a first prediction score for first input data, the first state comprising a first set of weights of the machine learning model;
determining a first covariance matrix for the first state of the machine learning model based at least in part on the first prediction score;
determining an incremental update for the machine learning model between a previous time step and a current time step, the incremental update comprising a second state for the machine learning model, the second state comprising a second set of weights of the machine learning model, wherein the second state is determined based at least in part on the first set of weights and the first covariance matrix using an extended Kalman filter;
determining, using the machine learning model having the second state, a second prediction score for second input data; and
determining a decision surface with dimensions of a first feature of the first input data and a prediction score of the machine learning model;
comparing the second prediction score to the decision surface at a value of the first feature associated with the second input data; and
sending, to a computing device, data indicating that the second input data is potentially fraudulent.

18. The method of claim 17, further comprising:
determining a difference score between the first prediction score and a ground truth score associated with the first input data, wherein the first input data is associated with the previous time step and the second input data is associated with the current time step; and
determining the second state for the machine learning model further based at least in part on the difference score.

19. The method of claim 17, further comprising:
selecting a decay coefficient; and
adjusting a value of a weight of the second set of weights using the decay coefficient, wherein the decay coefficient is effective to emphasize the first input data over input data received prior in time to the first input data.

20. The method of claim 17, further comprising:
determining an importance weight based at least in part on a distance between a third input data and the decision surface; and
determining a third state for the machine learning model, the third state comprising a third set of weights of the machine learning model, wherein the third state is determined based at least in part on the importance weight.

21. The method of claim 17, further comprising determining the decision surface based at least in part on a first expected profit of third input data determined by the machine learning model to be non-fraudulent, and a second expected profit of the third input data determined by the machine learning model to be fraudulent.

* * * * *